(12) United States Patent
Lee et al.

(10) Patent No.: US 10,858,746 B2
(45) Date of Patent: Dec. 8, 2020

(54) METHOD OF MANUFACTURING GRAPHENE BY DC SWITCHING

(71) Applicant: INDUSTRY FOUNDATION OF CHONNAM NATIONAL UNIVERSITY, Gwangju (KR)

(72) Inventors: Wonoh Lee, Gwangju (KR); Sungmook Lim, Gwangju (KR); Jong Hun Han, Goyang-si (KR)

(73) Assignee: INDUSTRY FOUNDATION OF CHONNAM NATIONAL UNIVERSITY

( * ) Notice: Subject to any disclaimer, the term of this patent is extended or adjusted under 35 U.S.C. 154(b) by 98 days.

(21) Appl. No.: 16/215,444

(22) Filed: Dec. 10, 2018

(65) Prior Publication Data

US 2019/0352787 A1    Nov. 21, 2019

(30) Foreign Application Priority Data

May 16, 2018 (KR) .......... 10-2018-0055814

(51) Int. Cl.
*C25B 3/00*    (2006.01)
*C25B 15/02*   (2006.01)
*C25B 1/00*    (2006.01)
*C01B 32/19*   (2017.01)

(52) U.S. Cl.
CPC .......... *C25B 15/02* (2013.01); *C01B 32/19* (2017.08); *C25B 1/00* (2013.01); *C01B 2204/30* (2013.01); *C01P 2004/04* (2013.01); *C01P 2006/40* (2013.01)

(58) Field of Classification Search
CPC ..................................... C25B 3/00

USPC .......................................... 205/342
See application file for complete search history.

(56) References Cited

U.S. PATENT DOCUMENTS

2013/0001089 A1* 1/2013 Li .............. B82Y 30/00
                                              205/106
2014/0238873 A1    8/2014 Li et al.

FOREIGN PATENT DOCUMENTS

JP    6166860 B2        7/2017
KR    20120103987 A     9/2012
KR    101307538 B1      9/2013

OTHER PUBLICATIONS

Tripathi et al., "Synthesis of High-Quality Graphene Through Electrochemical Exfoliation of Graphite in Alkaline Electrolyte," arXiv preprint arXiv:1310.7371 (2013), pp. 1-15. (Year: 2013).*

(Continued)

*Primary Examiner* — Edna Wong
(74) *Attorney, Agent, or Firm* — Renaissance IP Law Group LLP

(57) ABSTRACT

The present inventive concept provides a method of manufacturing graphene using electrochemistry, the method including dipping a cathode including metal and an anode including graphite into an electrolyte and applying a DC power supply between the cathode and the anode, wherein the DC power supply is a DC switching power supply applying a positive (+) voltage and a negative (−) voltage alternately and repetitively. The method according to the present inventive concept can simply mass-produce high purity graphene by applying the DC switching power supply, thereby efficiently controlling the ions to peel the graphite.

3 Claims, 4 Drawing Sheets

(56) References Cited

OTHER PUBLICATIONS

Yang et al., "Ultrafast Delamination of Graphite Into High-Quality Graphene Using Alternating Currents," Angew. Chem. Int. Ed. (2017), vol. 56, pp. 6669-6675. (Year: 2017).*
Liscio, Andrea et al., "Understanding the exfoliation processes of GRM", Graphene Flagship, Mar. 31, 2017, p. 1-14.
Su, Ching-Yuan et al., "High-Quality Thin Graphene Films from Fast Electrochemical Exfoliation", ACS Nano. Feb. 10, 2011., vol. 5, No. 3, p. 2332-2339.

* cited by examiner

Com.Ex. 1

5 min    10 min    15 min    20 min

Ex. 3

METHOD OF MANUFACTURING GRAPHENE BY DC SWITCHING

CROSS-REFERENCE TO RELATED APPLICATION

This patent application claims the benefit of priority under 35 U.S.C. 119 of Korean Patent Application No. 10-2018-0055814, filed on May 16, 2018, the contents of which are hereby incorporated by reference for all purposes as if fully set forth herein.

BACKGROUND

Technical Field

The present disclosure relates to a method of manufacturing graphene using electrochemistry, and more specifically, to a method of manufacturing graphene, the method which simply enables a mass production of high purity graphene by applying a DC switching power supply and efficiently controlling ions, thereby peeling graphite.

Related Art

Graphite, as material having a typical layered structure, has graphene stacked therein, the graphene having a two-dimensional plate structure in which carbon atoms are connected to one another in a hexagonal shape. The graphene, as a single flat sheet formed by bonding three carbon atoms in a $SP^2$ hybrid orbital bond, is formed a shape in which hexagonal honeycomb-like crystal lattices are connected.

Although a bond between carbon atoms within graphene that forms each of layers in graphite is very strong as a covalent bond, a bond between the graphene, as Van der Waals bond, is very weak compared to the covalent bond.

Graphene is an layer of graphite, i.e., a (0001) plane single layer of graphite, and graphene with a two-dimensional structure having a very thin thickness of about 4 Å may exist since a bond between graphenes in graphite is weak as described above.

Very useful characteristics different from those of existing materials have been found in such graphene. Graphene has the most notable feature that the electrons flow just as if the electrons have a zero mass when electrons move in graphene, and this means that the electrons flow in a rate of moving light in vacuum, i.e., at the speed of light. Further, such graphene has a feature of having an abnormal half-integer quantum hall effect with respect to electrons and holes.

Graphene in which carbon atoms are formed in a honeycomb structure has strength 200 times or more stronger than steel, electrical conductivity 100 times or more superior than copper, and thermal conductivity 2 times or more better than diamond. Therefore, graphene has been spotlighted as "new material of dream" which is to be used in a display, energy, environmental or semiconductor fields.

Above all, a final product of the carbon nanotubes has a high price although the carbon nanotubes are synthesized using inexpensive material since yield is very low when, after performing a synthesis process, a purification process is performed on carbon nanotubes that are series similar to those of the graphene, while graphite has an advantage that it is very inexpensive. Single-walled carbon nanotubes not only have metal and semiconductor characteristics varied according to chirality and diameter of the single-walled carbon nanotubes, but also has characteristics that band gaps of the single-walled carbon nanotubes are all different although the single-walled carbon nanotubes have the same semiconductor characteristics. Therefore, in order to use specific semiconductor properties or metallic properties from given single-walled carbon nanotubes, it is necessary to separate all of respective single-walled nanotubes, and it has been known to be very difficult to separate all of the respective single-walled nanotubes.

Meanwhile, graphene has an advantage that a device can be easily designed since electrical properties of the graphene vary according to a crystalline orientation of graphene having a given thickness such that a user can show electrical characteristics in a selection direction. In the future, characteristics of such a graphene can be used more effectively in carbon-based electrical devices, carbon-based electromagnetic devices, or the like.

A mechanical exfoliation method, a chemical exfoliation method, an exfoliation-reinsertion-expansion method, a chemical vapor deposition method, an electrochemical exfoliation method, and the like are disclosed as methods for obtaining graphene.

The mechanical exfoliation method, as a mechanical exfoliation method using adhesive strength of a scotch tape, is a method of collecting the graphene as graphene detached from graphite is adhered to the surface of the cellophane tape when detaching the cellophane tape from the graphite sample after attaching a cellophane tape to a graphite sample. However, the mechanical exfoliation method has problems that the graphene detached from graphite is formed in an irregular form as a paper-torn shape, it is not possible to obtain graphene with a large area as the graphene just has a size of a micrometer level only, and the graphene is not suitable for a research requiring a large amount of sample as the graphene has an extremely low final yield.

The chemical exfoliation method is a method of reducing the graphene oxide into graphene again using a reducing agent such as hydrazine or the like after producing a graphene oxide dispersed onto an aqueous solution by oxidizing graphite and disintegrating the oxidized graphite through ultrasonic waves or the like. However, the chemical exfoliation method has a problem that inherent excellent physical and electrical properties of graphene are dropped since the oxidized graphene is not fully reduced, but reduced in an amount of about 70% only such that many defects are remained in the graphene.

The exfoliation-reinsertion-expansion method is a method of manufacturing graphene, the method comprising inserting fuming sulfuric acid into graphite, injecting the fuming sulfuric acid inserted into graphite into a furnace having a very high temperature, enabling graphite to be expanded by a sulfuric acid gas while sulfuric acid is being expanded, and dispersing the expanded graphite into a surfactant such as TBA. Graphene does not show satisfactory electrical properties since such an exfoliation-reinsertion-expansion method also has a very low actual graphene yield, and an interlayer contact resistance of the graphene is high due to the used surfactant.

The chemical vapor deposition method is a method of synthesizing graphene using as a catalyst layer a transition metal which well forms carbon and carbide alloy or well adsorbs carbon at high temperatures. In this method, processes are demanding, a heavy metal catalyst is used, and there are many restrictions in the mass production.

On the other hand, Korean Patent Laid-Open Publication No. 10-2012-0103987 discloses a method of manufacturing graphene, the method comprising dipping an anode including graphite and a cathode including metal into an electrolyte, and applying a current between the anode and the cathode as a method of manufacturing graphene using electrochemistry. However, the method has limits that yield and purity of the graphene are lowered as ions are consistently stacked between graphites according as a predetermined DC power supply is applied.

SUMMARY

The present inventive concept provides a method of simply enabling a mass production of high purity graphene compared to a conventional manufacturing method.

A method of manufacturing graphene according to one aspect of the present inventive concept is provided. The method comprises dipping a cathode including metal and an anode including graphite into an electrolyte and applying a DC power supply between the cathode and the anode, wherein the DC power supply is a DC switching power supply applying a positive (+) voltage and a negative (−) voltage alternately and repetitively.

An absolute value of the negative (−) voltage may be the same as or less than that of the positive (+) voltage.

A time of applying the positive (+) voltage may be the same as or longer than that of applying the negative (−) voltage.

A ratio of the times of applying the positive (+) voltage and the negative (−) voltage may be 5:1 to 1:1.

The absolute value of the negative (−) voltage may be the same as or less than that of the positive (+) voltage, and the time of applying the positive (+) voltage may be the same as or longer than that of applying the negative (−) voltage.

BRIEF DESCRIPTION OF THE DRAWINGS

FIG. 2 shows graphenes manufactured according to Examples and Comparative Examples as time goes by.

DESCRIPTION OF EXEMPLARY EMBODIMENTS

Figure 1:
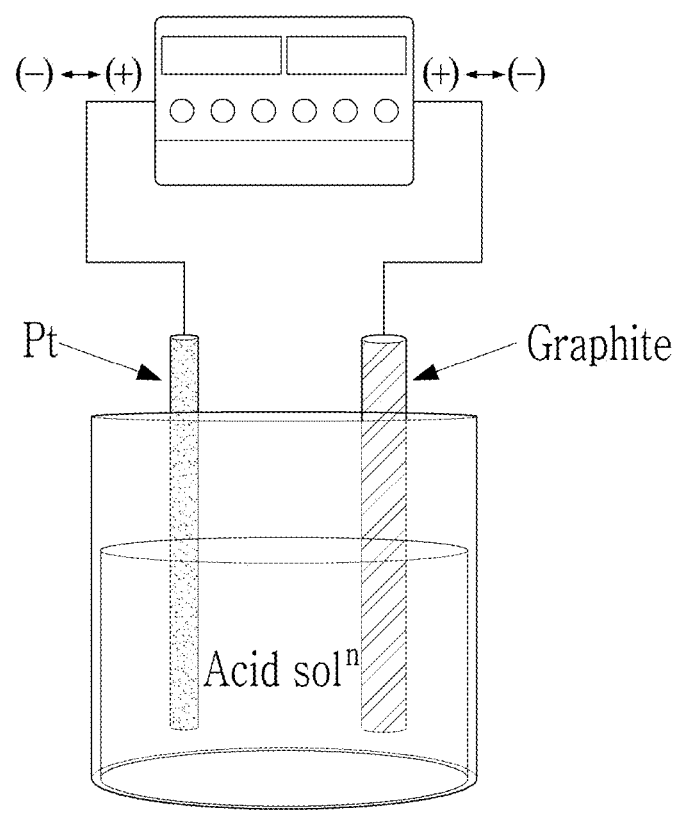
FIG. 1 is an example of an electrochemical device for carrying out the present inventive concept.
Figure 2:
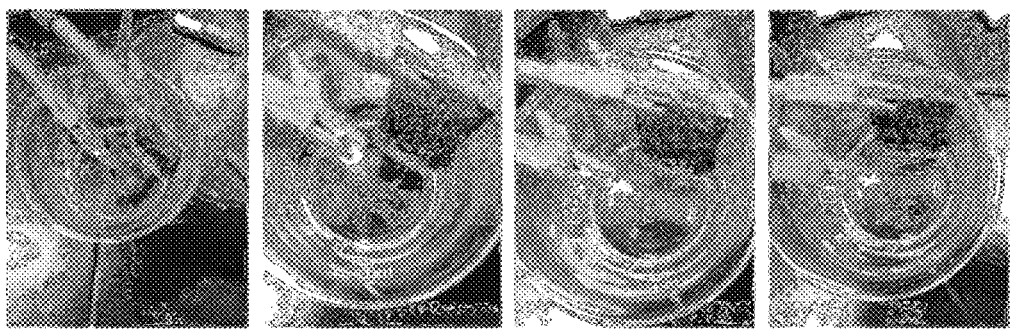
Figure 2:
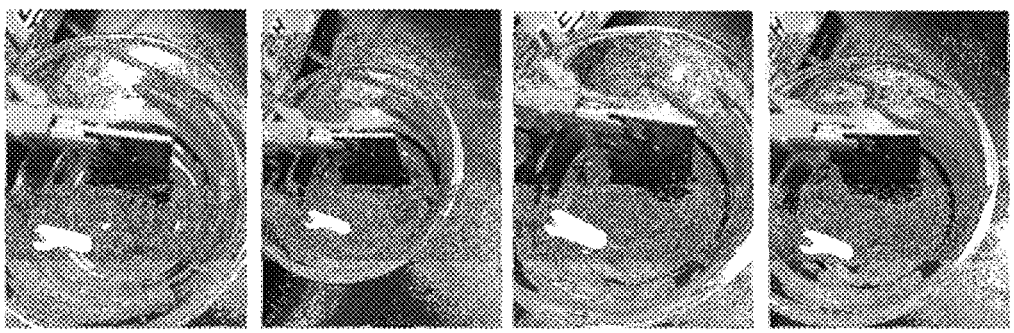

Hereinafter, embodiments of the present invention will be described in detail. However, these embodiments are only exemplary, the present invention is not limited thereto, but is only defined by the scope of the claims described below.

In the description of the present inventive concept, if detailed descriptions of related disclosed art or configuration are determined to unnecessarily make the subject matter of the present inventive concept obscure, they will be omitted.

In addition, terms, such as first, second, A, B, (a), (b) or the like may be used herein when describing components of the present inventive concept. Such terms are used for merely discriminating the corresponding elements from other elements and the corresponding elements are not limited in their essence, sequence, or precedence by the terms.

In describing the present inventive concept, terms of extent such as "about", "substantially", "degree" or the like are used in a sense that is close from or to numerical values of the allowable errors when inherent manufacturing and material allowable errors are suggested to mentioned meanings, and the terms of extent are used to prevent an unscrupulous pirate from unfairly using the disclosure in which accurate or absolute numerical values are mentioned in order to help understanding of the present inventive concept.

The present disclosure is a method of manufacturing graphene using an electrochemical exfoliation method.

The electrochemical exfoliation method, as a method of manufacturing graphene by applying a DC voltage to graphite of layered structures, can peel off graphene from the graphite by penetrating ions included in an electrolyte between the layered structures of the graphite when the DC voltage is applied. However, when the DC voltage is constantly applied, a phenomenon of reducing peeling efficiency occurs since the ions penetrated between the graphite layered structures are consistently stacked up.

The present inventors have completed the present inventive concept by discovering that high purity graphene can be efficiently manufactured when the ions stacked up between the graphite layered structures are controlled.

The method of manufacturing graphene according to one aspect of the present inventive concept is a method of manufacturing graphene, the method comprising applying a DC power supply between the cathode and the anode after dipping a cathode including metal and an anode including graphite into an electrolyte, wherein the DC power supply is a DC switching power supply applying a positive (+) voltage and a negative (−) voltage alternately and repetitively.

The DC switching power supply means a DC power supply applying the positive (+) voltage and the negative (−) voltage alternately and repetitively.

The high purity graphene can be simply mass-produced by repeating a process of applying the positive (+) voltage in the DC switching power supply of the present inventive concept such that anions within the electrolyte are penetrated and stacked up between the layered structures of the graphite that is an anode electrode, and a process of applying the negative (−) voltage in the DC switching power supply of the present inventive concept such that the anions stacked up between the graphite layered structures are discharged into the electrolyte.

The cathode is formed by including metal, and the cathode may be made of any suitable material publicly known to those skilled in the art since the cathode does not play a role in the production of graphene except that the cathode provides a counter electrode for cations. Preferably, the cathode is used in metal such as gold, platinum or the like. However, the cathode is not limited thereto.

The anode may include a layered graphite compound into which the anions can be inserted. Examples of preferable materials for the anode may include highly oriented pyrolytic graphite (HOPG), expanded graphite, natural graphite, synthetic graphite, and the like. The expanded graphite has a large layer gap by including various graphite intercalation compounds, and this may increase separation speed by facilitating insertion of the anions between layers.

The electrolyte includes ions within a solvent, and plays a role of easily peeling graphite while repetitively performing processes of inserting anions among the ions between graphite layered structures of an anode and discharging the anions inserted between the graphite layered structures of the anode. Examples of the electrolyte may include acidic aqueous solutions such as sulfuric acid, hydrochloric acid, nitric acid, phosphoric acid, and the like. However, the electrolyte is not limited thereto.

In the present inventive concept, it is preferable that the absolute value of the negative (−) voltage is the same as or less than that of the positive (+) voltage. The reason for this is that the anions discharged from between the graphite layered structures are redischarged before the anions are sufficiently inserted between the graphite layered structures if the absolute value of the negative (−) voltage is more than that of the positive (+) voltage.

It is preferable that the time of applying the positive (+) voltage is the same as or longer than that of applying the negative (−) voltage.

A ratio of the times of applying the positive (+) voltage and the negative (−) voltage may be 5:1 to 1:1, and a ratio of the times may be 5:1 to 2:1 when the time of applying the positive (+) voltage is the same as that of applying the negative (−) voltage.

According to the ratio of the times of applying the positive (+) voltage and the negative (−) voltage, peeling of high purity graphite is easily progressed by repetitively performing processes of alternately applying the positive (+) voltage and the negative (−) voltage, the processes including inserting the anions between the graphite layered structures during the time of applying the positive (+) voltage, sufficiently discharging the anions during the time of alternately applying the negative (−) voltage, and sufficiently inserting the anions between the graphite layered structures when the positive (+) voltage is applied again.

Meanwhile, when a constant voltage is applied to the DC power supply, the anions inserted between the graphite layered structures are consistently stacked up to interrupt peeling of the graphite. When the time of applying the negative (−) voltage is relatively short compared to the time of applying the positive (+) voltage, the anions inserted between the graphite layered structures are not sufficiently discharged, but are restacked up to interrupt peeling of the graphite. Further, when the time of applying the negative (−) voltage is relatively long compared to the time of applying the positive (+) voltage, peeling of the graphite is interrupted as the anions are redischarged before discharged anions are sufficiently inserted between the graphite layered structures.

Therefore, it is preferable to apply the positive (+) voltage and the negative (−) voltage within the time ratio range in order to simply obtain high purity graphene in a large amount.

Hereinafter, the present inventive concept will be described in further detail with reference to Examples and Comparative Examples. However, the scope of the present inventive concept is not limited to the following Examples.

EXAMPLES

Example 1

As shown in FIG. 1, a platinum (Pt) electrode as a cathode and an exfoliated graphite electrode as an anode were used, and the two electrodes were dipped into an aqueous sulfuric acid solution that is an electrolyte. A DC switching power supply alternately repeating 20 times +20V for 50 seconds and −20V for 10 seconds as a power supply was applied between the two electrodes. Thereafter, graphene was obtained in a rate of 2.495 mg/min after washing and drying a powder produced thereafter.

Example 2

Graphene was obtained in a rate of 3.235 mg/min in the same manner as in Example 1 except that a DC switching power supply alternately repeating 20 times +20V for 50 seconds and −20V for 15 seconds as a power supply was applied.

Example 3

Graphene was obtained in a rate of 3.055 mg/min in the same manner as in Example 1 except that a DC switching power supply alternately repeating 17 times +20V for 50 seconds and −20V for 20 seconds as a power supply was applied.

Example 4

Graphene was obtained in a rate of 1.935 mg/min in the same manner as in Example 1 except that a DC switching power supply alternately repeating 16 times +20V for 50 seconds and −20V for 25 seconds as a power supply was applied.

Example 5

Graphene was obtained in a rate of 2.920 mg/min in the same manner as in Example 1 except that an expanded graphite electrode was used as the anode, and a DC switching power supply alternately repeating 2 times +30 V for 45 seconds and −10 V for 45 seconds as a power supply was applied.

Comparative Example 1

Graphene was obtained in a rate of 1.750 mg/min in the same manner as in Example 1 except that a constant DC power supply as a power supply applied +20V for 1,200 seconds.

Comparative Example 2

Graphene was obtained in a rate of 1.680 mg/min in the same manner as in Example 1 except that a DC switching power supply alternately repeating 20 times +20V for 50 seconds and −20V for 5 seconds as a power supply was applied.

Comparative Example 3

Graphene was obtained in a rate of 1.290 mg/min in the same manner as in Example 1 except that a DC switching power supply alternately repeating 15 times +20V for 50 seconds and −20V for 30 seconds as a power supply was applied.

Comparative Example 4

Graphene was obtained in a rate of 1.335 mg/min in the same manner as in Example 1 except that a DC switching power supply alternately repeating 12 times +20V for 50 seconds and −20V for 50 seconds as a power supply was applied.

The following Table 1 shows power supply conditions and yields of the above-mentioned Examples and Comparative Examples.

TABLE 1

| | Power supply conditions | Yields (mg/min) |
|---|---|---|
| Comparative Example 1 | DC (+20 V, 1200 s) | 1.750 |
| Comparative Example 2 | DC switching (+20 V, 50 s), (−20 V, 5 s), loop 20 | 1.680 |
| Example 1 | DC switching (+20 V, 50 s), (−20 V, 10 s), loop 20 | 2.495 |
| Example 2 | DC switching (+20 V, 50 s), (−20 V, 15 s), loop 20 | 3.235 |
| Example 3 | DC switching (+20 V, 50 s), (−20 V, 20 s), loop 17 | 3.055 |
| Example 4 | DC switching (+20 V, 50 s), (−20 V, 25 s), loop 16 | 1.935 |
| Example 5 | DC switching (+30 V, 45 s), (−10 V, 45 s), loop 2 | 2.920 |
| Comparative Example 3 | DC switching (+20 V, 50 s), (−20 V, 30 s), loop 15 | 1.290 |
| Comparative Example 4 | DC switching (+20 V, 50 s), (−20 V, 50 s), loop 12 | 1.335 |

Referring to table 1 above, it can be seen that graphene yields of Examples 1 to 5 according to the present inventive concept are higher than those of Comparative Examples 1 to 4.

In the case of Examples 1 to 5, anions ($SO_4^{2-}$) are inserted between graphite layered structures during a time of applying a positive voltage, the anions ($SO_4^{2-}$) are sufficiently discharged from between the graphite layered structures during a time of applying a negative voltage, and the anions ($SO_4^{2-}$) are inserted between the graphite layered structures to easily progress peeling of graphite when a positive voltage is applied again.

On the other hand, the anions ($SO_4^{2-}$) inserted between the graphite layered structures are consistently stacked up to interrupt peeling of the graphite by applying a constant DC voltage in the case of Comparative Example 1. The anions ($SO_4^{2-}$) inserted between the graphite layered structures are not sufficiently discharged, but are restacked up to interrupt peeling of the graphite since the time of applying the negative voltage is relatively short compared to the time of applying the positive voltage in the case of Comparative Example 2. Before discharged anions ($SO_4^{2-}$) are sufficiently inserted between the graphite layered structures, the discharged anions ($SO_4^{2-}$) are redischarged from between the graphite layered structures to interrupt peeling of the graphite since the time of applying the negative voltage is relatively long compared to the time of applying the positive voltage in the case of Comparative Examples 3 and 4.

Experimental Example

<Electrical Property Analysis>

Figure 3:
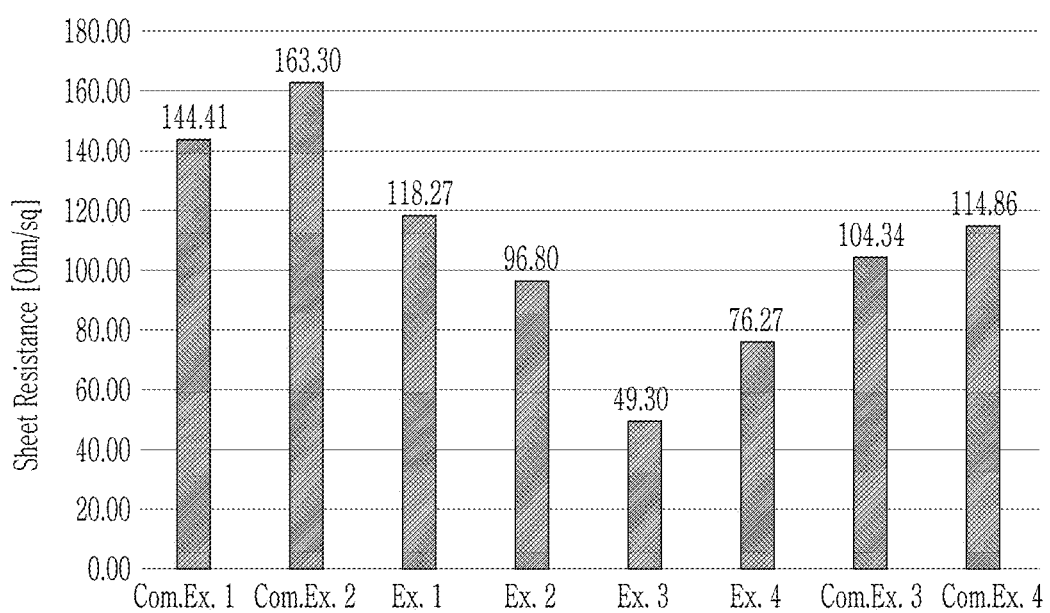
FIG. 3 is a graph showing electrical properties of the graphenes manufactured according to Examples and Comparative Examples.
Figure 4:
FIG. 4 is an atomic force microscope (AFM) image of a graphene sheet manufactured according to Example 5 of the present disclosure.

Sheet resistance values of the graphenes obtained in Examples and Comparative Examples were measured, and the sheet resistance values of the graphenes are shown in a graph of FIG. 3.

Referring to FIG. 3, it can be seen that the sheet resistance values of the graphenes obtained by Examples of the present inventive concept are reduced as much as maximum 70% compared to those of the graphenes obtained by Comparative Examples.

The above description is only for an illustrative description of the present inventive concept, and a skilled person in the art which the present inventive concept belongs to may understand that the present inventive concept can be realized as an altered formation without departing from the scope of essential characteristics of the present inventive concept. Therefore, the disclosed Examples and Experimental Example should be considered in a descriptive sense only and not for purposes of limitation. The scope of the present inventive concept is defined not by the detailed description of the invention but by the appended claims, and all differences within the scope will be construed as being included in the present inventive concept.

According to the present inventive concept, high purity graphene can be simply mass-produced by applying a DC switching power supply and efficiently controlling ions inserted between graphite layered structures, thereby peeling graphite.

What is claimed is:

1. A method of manufacturing graphene, the method comprising:
    dipping a cathode including metal and an anode including graphite into an electrolyte; and
    applying a DC power supply between the cathode and the anode,
    wherein the DC power supply is a DC switching power supply applying a positive (+) voltage and a negative (−) voltage alternately and repetitively,
    wherein an absolute value of the negative (−) voltage is the same as or less than that of the positive (+) voltage,
    wherein, if an absolute value of the negative (−) voltage is the same as that of the positive (+) voltage, a ratio of the times of applying the positive (+) voltage and the negative (−) voltage is in a range from 5:1 to 2:1, and
    wherein, if an absolute value of the negative (−) voltage is less than that of the positive (+) voltage, the time of applying the positive (+) voltage is the same as or longer than that of the negative (−) voltage.

2. The method of claim 1, wherein, if an absolute value of the negative (−) voltage is less than that of the positive (+) voltage, a ratio of the times of applying the positive (+) voltage and the negative (−) voltage is 5:1 to 1:1.

3. The method of claim 1, wherein the electrolyte is an acid solution.

* * * * *